United States Patent [19]
Kuehl et al.

[11] 3,756,378
[45] Sept. 4, 1973

[54] CARGO TRANSPORTING CONVEYOR APPARATUS

[75] Inventors: Guenther L. Kuehl, Peekskill; Alfonso DePietro, Valhalla, both of N.Y.

[73] Assignee: Guenther Systems, Inc., Buchanan, N.Y.

[22] Filed: June 1, 1971

[21] Appl. No.: 148,865

[52] U.S. Cl. .............................................. 198/154
[51] Int. Cl. ......................................... B65g 17/00
[58] Field of Search.................... 198/154, 153, 158, 198/194, 195; 74/242.11 P

[56] References Cited
UNITED STATES PATENTS

| | | | |
|---|---|---|---|
| 3,184,039 | 5/1965 | Czarnecki | 198/154 |
| 837,111 | 11/1906 | Peabody | 198/195 |
| 3,583,550 | 6/1971 | Gardiner | 198/154 |
| 3,447,666 | 6/1969 | Nevo-Hacohen | 198/158 |

FOREIGN PATENTS OR APPLICATIONS

| | | | |
|---|---|---|---|
| 1,366,836 | 6/1964 | France | 198/154 |

*Primary Examiner*—Evon C. Blunk
*Assistant Examiner*—Douglas D. Watts
*Attorney*—Brumbaugh, Graves, Donohue & Raymond

[57] ABSTRACT

A cargo carrying structure is adapted to move along a path defined by a frame while supported by a plurality of chains. A plurality of sprocket sets, each including an inner and an outer sprocket, are supported by the frame and engaged by the chains. A plurality of rods which connect the outer chains to the cargo carrying structure are arranged to pass between the teeth of the inner sprockets. The rods are connected to intermediate connecting members which carry rollers engaged by roller guides. At least one of the chains is formed by a multiplicity of links that span a predetermined number of sprocket teeth and a lesser number of adjusting links that span a different number of sprocket teeth. The adjusting links are positioned in the chain so that the rods pass through the unfilled spaces between the teeth of the inner sprockets.

10 Claims, 5 Drawing Figures

FIG. I

INVENTORS.
GUENTHER L. KUEHL &
ALFONSO DEPIETRO
their ATTORNEYS.

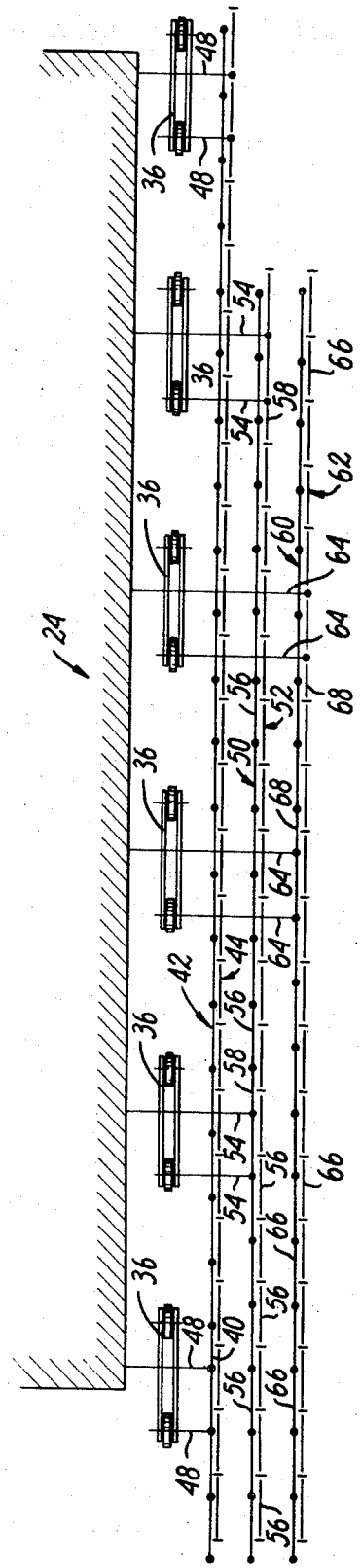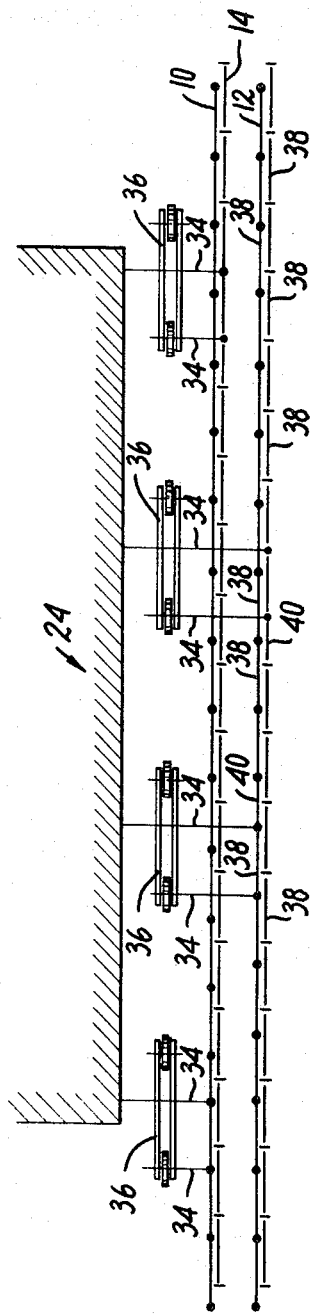

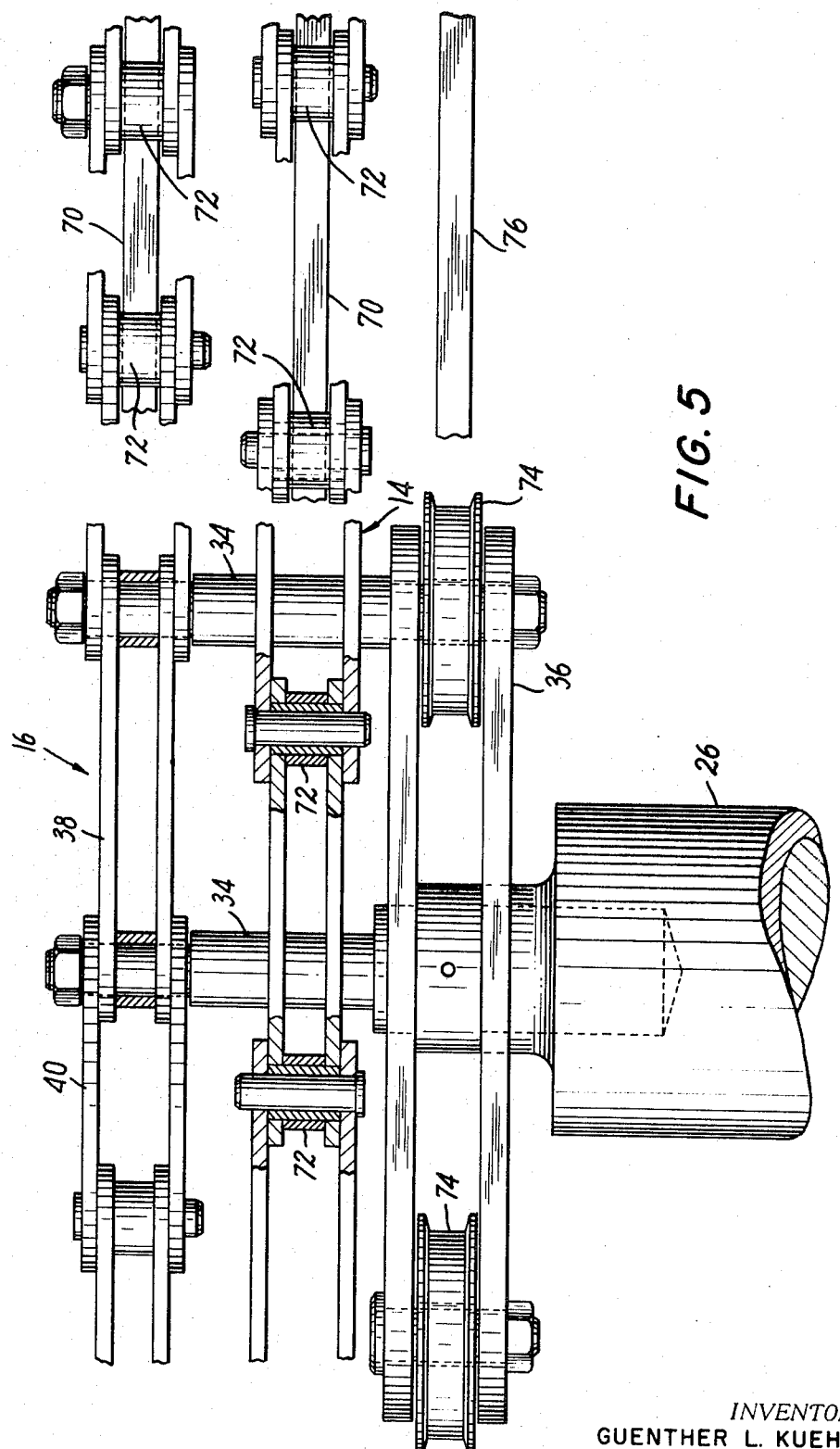

CARGO TRANSPORTING CONVEYOR APPARATUS

BACKGROUND OF THE INVENTION

This invention relates to a cargo transporting conveyor apparatus, and more particularly to a conveyor apparatus in which a cargo carrying structure is supported by a plurality of chains.

It is known to construct a conveyor apparatus in which the load carrying structure is supported on either side by a plurality of chains. An apparatus of this type is disclosed in U.S. Pat. No. 3,578,145, issued to Guenther L. Kuehl on May 11, 1971, entitled "Transport Device." The apparatus shown in that patent utilizes sets of coaxial sprockets to guide and support the chains. The chains which ride on the outer sprockets must be connected to the cargo carrying structure by rods that pass over or under the inner chains. It is often necessary in devices of this type to arrange the sprockets so that the side of the chain which is on the outside as the chain is engaged by one sprocket will be on the inside as the chain is engaged by another sprocket. It is, therefore, necessary for the rods connecting the outer chains to the cargo carrying structure to be able to pass through unfilled spaces between the teeth of the inner sprockets. Chains having the desired pitch do not, in many instances, leave unfilled spaces in the inner sprockets which are arranged in manner that permits rods connected to the outer chains to pass through.

Another design limitation which has been associated with apparatus of the type described above is that the dimensions of the inner sprockets limit the size of the rods connecting the outer chains to the cargo carrying structure. If the apparatus is intended to carry a relatively heavy load, a large number of separate connections between the outer chains and the cargo carrying structure is necessary. Moreover, the number of possible connections is limited by the configuration of the chains and the cargo carrying structure. If a relatively small number of separate heavy bars are used to support the cargo, only a small number of locations are available for connection to the chains, i.e., one location at the end of each bar.

Another difficulty previously encountered in the design of conveyor apparatus is that the load is always suspended between the chains. The forces acting on the components of the chain are particularly high when the load is moved horizontally. It is, therefore, desirable to find a simple and effective way to support the cargo independently of the strength of the chains while the cargo is moved horizontally.

SUMMARY OF THE INVENTION

The present invention includes a number of improvements over previously known apparatus in which a cargo carrying structure is supported by a plurality of chains. The apparatus is made more efficient, simpler, more compact, and able to handle considerably heavier loads. It comprises a frame defining a path along which the cargo can be moved, a cargo carrying structure adapted to be moved along the path defined by the frame, and a plurality of chains connected to and supporting the cargo carrying structure. A plurality of coaxial sprocket sets are supported by the frame and engage the links of the chains, each sprocket set comprising an inner sprocket and an outer sprocket. A plurality of rods are provided which connect at least one outer chain to the cargo carrying structure. The rods are arranged to pass between the teeth of the inner sprockets. At least one of the chains is formed by a multiplicity of links that span a predetermined number of sprocket teeth and a lesser number of adjusting links that span a different number of sprocket teeth. The adjusting links are positioned in the chain so that the rods pass through the unfilled spaces between the teeth of the inner sprockets. In one embodiment of the invention which is described in detail below, the links that are not adjusting links span three teeth of the sprockets, and the adjusting links span a single tooth.

The load carrying capacity of the apparatus can be increased without increasing the size of the openings in the inner sprockets through which the rods must pass by utilizing intermediate connecting members, each of which is connected to two or more rods. The intermediate connecting member is connected to the cargo carrying structure at a single location, thus permitting that structure to pivot with respect to the intermediate connecting member.

The load carrying capacity of the apparatus can be further increased by providing a plurality of rollers carried by the intermediate connecting members. These rollers are engaged by roller guides that extend along the horizontal portions of the path followed by the cargo carrying structure. This provides support for the cargo carrying structure along the portions of the path where the forces acting on the chains are greatest.

BRIEF DESCRIPTION OF THE DRAWINGS

An understanding of additional aspects of the invention can be gained from a consideration of the following detailed description of representative embodiments of the invention taken in conjunction with the appended drawings wherein:

FIG. 3 is a schematic representation of a portion of the apparatus shown in FIG. 1;

FIG. 4 is a schematic representation of a portion of a modified form of the apparatus shown in FIG. 1; and FIG. 5 is a detailed drawing of a part of the apparatus shown in FIG. 1.

DESCRIPTION OF THE PREFERRED EMBODIMENTS

Figure 1:
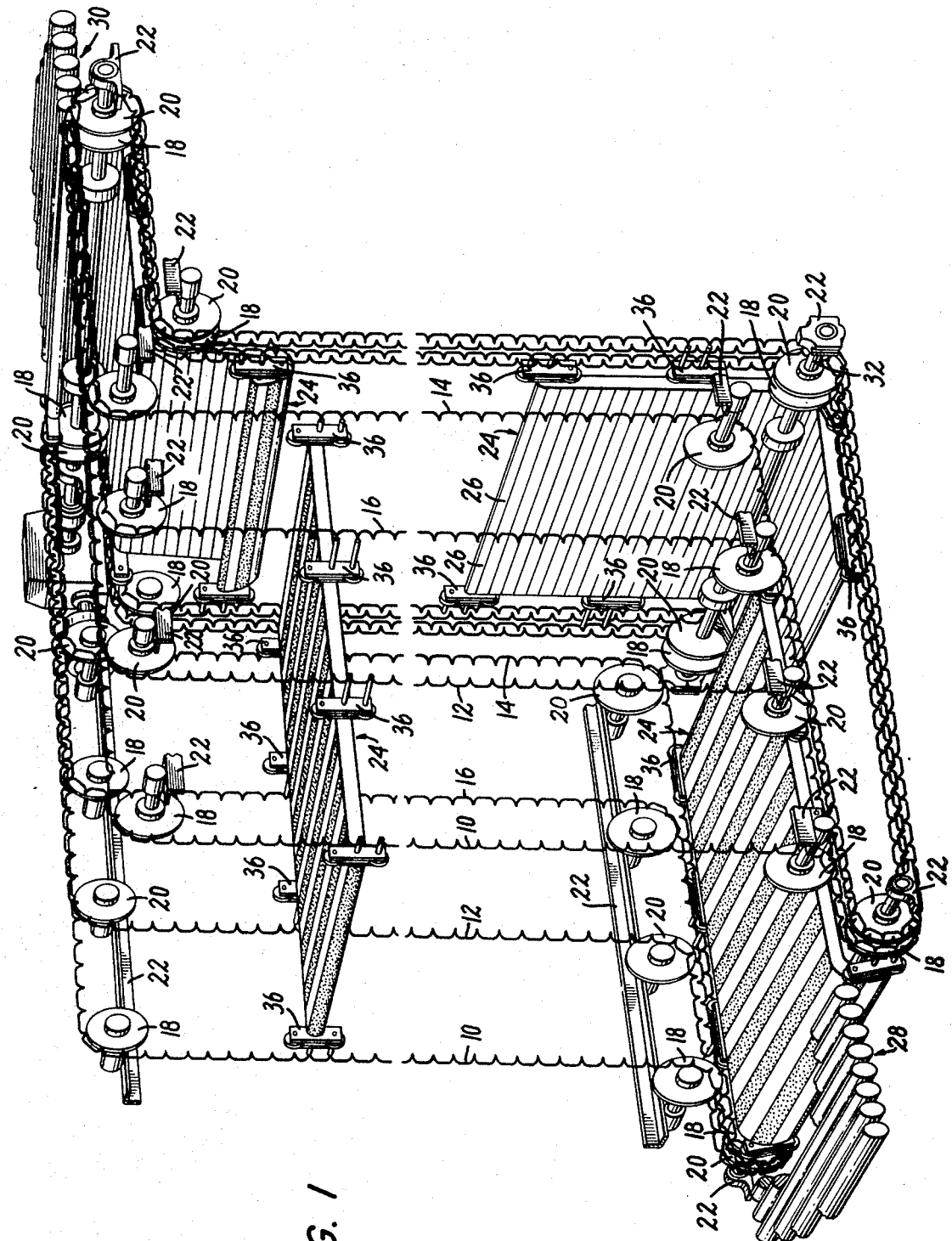
FIG. 1 is a pictorial illustration of a cargo transporting conveyor apparatus constructed in accordance with the invention.

A cargo transporting conveyor apparatus is shown in FIG. 1. The construction and operation of an apparatus which is similar in many respects is described in detail in U.S. Pat. No. 3,578,145, entitled "Transport Device," issued to Guenther L. Kuehl on Nov. 2, 1969. That document is incorporated by reference herein.

The apparatus shown in FIG. 1 includes four chain pairs 10, 12, 14 and 16. The chains 10 and 14 on each side of the apparatus are arranged in superposed interlocking relationship and are engaged by a plurality of inner sprockets 18. The outer chains 12 and 16 are similarly arranged in superposed interlocking relationship and are engaged by a plurality of outer sprockets 20. The construction of the chain pairs and the manner in which they cooperate with each other is described in detail in U.S. Pat. No. 3,583,550, entitled Chain Drive, issued on June 8, 1971, to Bayard G. Gardineer, Jr. That document is incorporated by reference herein.

The sprockets 18 and 20 are supported by a frame 22. Only fragmentary portions of the frame 22 are shown in FIG. 1 so as not to obscure other parts of the apparatus. A plurality of cargo carrying structures 24 are supported on either side by the chain pairs 10, 12, 14 and 16. Each cargo carrying structure 24 includes a series of pivotably joined elongated tubular sections 26. A preferred embodiment of this cargo carrying structure 24 is described in greater detail in copending application Ser. No. 148,385, entitled A Platform Assembly for a Multiple Chain Transport Device, filed on June 1, 1971. The cargo carrying structure 24 need not be a continuous web-like structure as illustrated in FIG. 1, but may instead comprise a series of separate bars such as are shown in FIG. 10 of U.S. Pat. No. 3,578,145.

The cargo carrying structure 24 moves along a path defined by the frame 22 beginning at a loading point 28. The cargo is first moved horizontally away from the loading point 28, then vertically, and then horizontally again to an unloading point 30. The same path can be followed in the opposite direction by reversing the power supply.

The chain pairs 10, 12, 14 and 16 are separated throughout that portion of the path in which the cargo moves vertically. Throughout the remainder of the path, however, the chains 10, 12, 14 and 16 move together. Along this latter portion of the path, the sprockets 18 and 22 are arranged in sets including one inner sprocket 18 and a coaxial outer sprocket 20.

Figure 2:
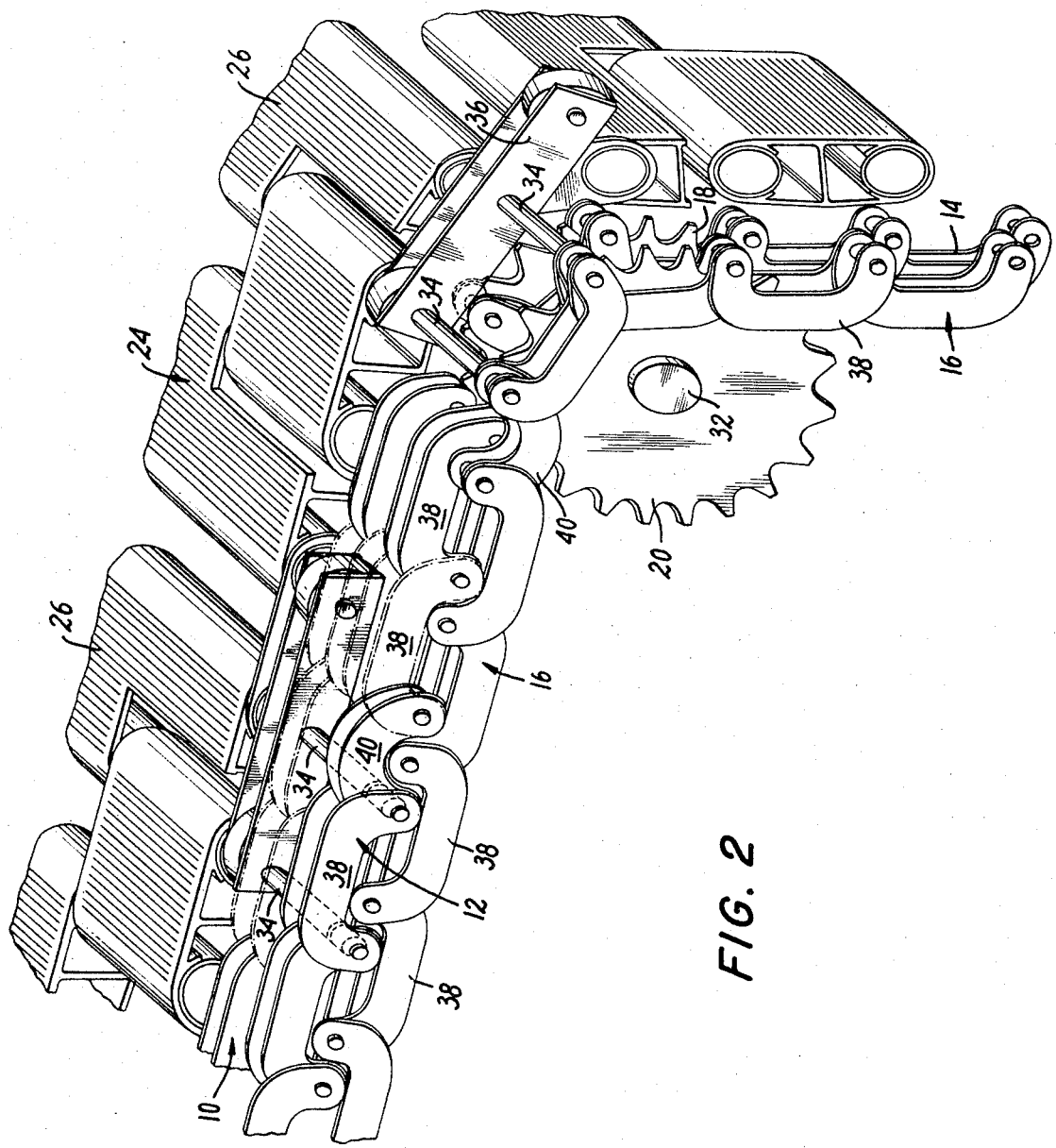
FIG. 2 is a three dimensional drawing of a portion of the apparatus shown in FIG. 1.

The manner in which the chain pairs 10, 12, 14 and 16 are connected to the cargo carrying structure 24 can be seen most clearly in FIG. 2, which shows in detail the sprockets 18 and 20 which are journaled on the right hand end (as shown in the drawing) of a shaft 32. The outer chains 12 and 16 are connected to the cargo carrying structure 24 by a plurality of rods 34 which pass through unfilled spaces between the teeth of the inner sprocket 18. On the other side of the inner sprocket 18, they are connected to an intermediate connecting member 36.

Each of the links of the inner chains 10 and 14 span three teeth of the inner sprocket 18. Therefore, each third space between the teeth of the sprocket 18 is not filled by the chains 10 and 14. The outer chains 12 and 16 are made up of a multiplicity of links 38 which are similar to the links of the inner chains 10 and 14 and, thus, span three teeth of the sprocket 20. The rods 34 are connected at the ends of the links 38 and are thus spaced by a distance equal to the distance between the unfilled spaces of the sprocket 18. Either of the outer chains 12 and 16 can easily be synchronized so that the attached rods 34 will fall into the unfilled spaces. If, however, it is assumed that the chain 16 is properly synchronized with the chains 10 and 14 then, assuming that all links in the outer chains 12 and 16 are of equal length, the chain 12 cannot be properly synchronized with the chains 10 and 14 because it cannot occupy the same position on the sprocket 20 as the chain 16. However, the rods 34 connected to both of the outer chains 12 and 16 are arranged in synchronization with the inner chains 10 and 14 by providing adjusting links 40 in each of the outer chains 12 and 16. The adjusting links 40 span a different number of teeth on the sprocket 20 than do the other more numerous links 38.

One adjusting link 40 is provided adjacent to each set of two rods 34. This short link 40 brings the rods 34 into synchronization with the unfilled spaces of the sprockets 18 which occur after every third tooth. The relationship between the chains 10, 12, 14 and 16 and the synchronizing effect of the adjusting links 40 can be seen most clearly in the schematic illustration of FIG. 3.

The concept of utilizing adjusting links to synchronize the rods connected to the outer chain or chains with unfilled spaces between the teeth of the inner sprockets can be applied to a variety of arrangements involving different numbers of chains having links which span different numbers of sprocket teeth. Many arrangements other than those specifically described here will occur to those skilled in the art. Another illustrative example of an arrangement similar to that shown in FIGS. 2 and 3 is shown schematically in FIG. 4.

The apparatus of FIG. 4 includes six chains. A chain 42 is arranged in superposed interlocking relationship with a chain 44 to ride on the innermost sprockets. These chains are connected to the cargo carrying structure 24 by a plurality of rods 48.

Another set of interlocking chains 50 and 52 are arranged as outer chains with respect to the inner chains 42 and 44. The chains 50 and 52 are connected to the cargo carrying structure 24 by a plurality of rods 54 which pass through the unfilled spaces between the teeth of the sprockets that engage the inner chains 42 and 44. To affect the desired synchronization, the chains 50 and 52 are each formed by a multiplicity of links 56 which span a predetermined number of sprocket teeth, preferably three, and a lesser number of adjusting links 58 that span a different number of sprocket teeth, preferably one.

A chain 60 and another chain 62 are arranged in interlocking relationship and engaged by the outermost sprockets. These chains are connected to the cargo carrying structure 24 by a plurality of rods 64. The rods 64 must pass through unfilled teeth in the sprockets that engage the chains 50 and 52 as well as the sprockets that engage the innermost chains 42 and 44. To affect the desired synchronization, the chains 60 and 62 are each formed by a multiplicity of links 66 that span a predetermined number of sprocket teeth, preferably three, and a lesser number of adjusting links 68 that span a different number of sprocket teeth, preferably one.

It will be apparent from a study of the arrangements shown in FIGS. 3 and 4 that the same principles can be employed to accommodate any number of chains each of which may be connected to the cargo carrying structure 24. The chains may be, but need not be, arranged in interlocking relationship to reduce the number of sprockets required. Moreover, the adjusting links could be provided in the inner chains instead of in the outer chains, thus shifting the positions of the unfilled spaces on the inner sprockets to synchronize them with the rods connected to the uniform length links of the outer chains.

Whatever arrangement of chains is selected, the rods which connect the outer chains to the cargo carrying structure 24 are limited in size by the dimensions of the spaces between the sprocket teeth which they must pass through. To increase the load carrying capacity of the apparatus, each connection is formed by two rods.

Each set of two rods is connected to an intermediate connecting member 36. This intermediate connecting member 36 is in turn connected to the load carrying structure 24 at a single location. The use of this single location connection permits the intermediate connecting members 36 and the associated rods to rotate with respect to the cargo carrying structure 24. This ability to rotate is necessary because the orientation of the chains with respect to the cargo carrying structure 24 changes as the structure 24 moves through the apparatus. It may be observed that in apparatus of FIG. 1 when the cargo is moving vertically the chains 10, 12, 14, and 16 and the intermediate connecting members 36 assume a vertical orientation perpendicular to the cargo carrying structure 24. When the cargo is moving horizontally, the members 36 have a horizontal orientation parallel to the cargo carrying structure 24.

It is not as important to use intermediate connecting members in combination with the innermost chains of a conveyor apparatus because the rods attached to those chains need not pass through sprocket teeth and may, therefore, be relatively large in diameter. It is, however, preferred to use them because it reduces the number of different parts required, and the use of more than one rod to form each connection to a chain increases the strength of that connection.

An intermediate connecting member 36 of the apparatus shown in FIG. 1 is shown in greater detail in FIG. 5. The connecting member 36 is rotatably attached at a single location to one of the members 26 that makes up the cargo carrying structure 24. It is also attached to two rods 34 which are attached to one of the outer chains 16. The rods 34 pass under an inner chain 14. The inner chain 10 and the outer chain 12 have been omitted in FIG. 5 to make the drawing more easily understood. Each of the chains 10, 12, 14, and 16 ride on a plurality of chain guides 70 which are supported by the frame 22. Each chain guide is provided with a plurality of rollers 72 which engage the chains. This reduces noise and friction throughout the apparatus.

The intermediate connecting members 36 each carry two rollers 74 which ride on roller guides 76 supported by the frame 22. The roller guides 76 are arranged along those portions of the path along which the cargo moves in a horizontal direction. When the chains are suspended horizontally, the forces acting on the components of the chain would be greatly multiplied if support for the load were not provided by the roller guides 76.

The rollers 74 carried by the intermediate connecting member 36 are spaced apart by a distance that exceeds the length of the chain links 38. This permits the connecting member 36 and associated rollers 74 to pass over short interruptions in the roller guides 76 which occur at points where the chains 12 and 16 separate. The chain guides 70 and the roller guides 76 are not shown in FIG. 1 to avoid unnecessary complexity in the drawings.

Although the invention has been described herein with reference to specific embodiments, many modifications and variations therein will readily occur to those skilled in the art. For example, different numbers of chains could be employed, and the cargo path could have a different configuration. One such different configuration is shown in co-pending application Ser. No. 112, entitled Boustrophedonic Transport Device, filed on Jan. 2, 1970. All such modifications and variations are included within the intended scope of the invention as defined by the following claims.

We claim:

1. A cargo transporting conveyor apparatus comprising a frame defining a path along which the cargo can be moved, a cargo carrying structure adapted to be moved along the path defined by the frame, a plurality of chains connected to and supporting the cargo carrying structure including adjacent each of two sides of the cargo carrying structure at least one outer chain and at least one inner chain disposed between said at least one outer chain and a side of the cargo carrying structure, a plurality of sprocket sets supported by the frame which engage the links of the chains, each sprocket set comprising an inner sprocket and an outer sprocket, a plurality of rods connecting to the cargo carrying structure at least one outer chain and at least one inner chain on each of said two sides of the cargo carrying structure and arranged to pass between the teeth of the inner sprockets, at least one of the chains being formed by a multiplicity of links that span a predetermined number of sprocket teeth and a lesser number of adjusting links that span a different number of sprocket teeth, the adjusting links being positioned in the chain so that the rods pass through the unfilled spaces between the teeth of the inner sprockets, and a link of each inner chain adjacent a rod connecting an outer chain to the cargo carrying structure being configured to permit the rod to lie generally in a plane of the inner chain.

2. The apparatus of claim 1 wherein at least two chains are arranged in superposed interlocking relationship.

3. The apparatus of claim 1 wherein the links that are not adjusting links span at least three teeth of the sprockets.

4. The apparatus of claim 3 wherein the adjusting links span a single tooth.

5. The apparatus of claim 1 further comprising a plurality of intermediate connecting members each of which is connected to the cargo carrying structure and to at least two of the rods.

6. The apparatus of claim 5 further comprising the plurality of rollers carried by the intermediate connecting members, and at least one roller guide mounted on the frame and arranged along at least part of the path to engage the rollers thereby providing support for the cargo carrying structure.

7. The apparatus of claim 1 further comprising a plurality of intermediate connecting members each of which is connected to the cargo carrying structure and to at least one rod, a plurality of rollers carried by the intermediate connecting members, and at least one roller guide mounted on the frame and arranged to engage the rollers.

8. The apparatus claim 7 wherein each intermediate connecting member carries at least two rollers which are spaced from each other by a distance that exceeds the length of the longest links of the chain.

9. A cargo transporting conveyor apparatus comprising a frame defining a path along which the cargo can be moved, a cargo carrying structure adapted to be moved along the path defined by the frame, a plurality of chains connected to and supporting the cargo carrying structure, a plurality of sprocket sets supported by the frame which engage the links of the chains, each sprocket set comprising an inner sprocket and an outer sprocket, a plurality of rods connected to an outer chain arranged to pass between the teeth of the inner sprocket, a plurality of intermediate connecting members connecting the rods to the cargo carrying structure, each intermediate connecting member being connected to at least two rods, a plurality of rollers carried by the intermediate connecting members and at least one roller guide mounted on the frame and arranged to engage the rollers thereby providing support for the cargo carrying structure.

10. The apparatus of claim 9 wherein each intermediate connecting member carries at least two rollers which are spaced from each other by a distance that exceeds the length of the longest links of the chain.

* * * * *